ized Patent [19]

United States Patent [19]
Moser

[11] Patent Number: 4,723,372
[45] Date of Patent: Feb. 9, 1988

[54] BARBLESS FISH HOOK
[75] Inventor: Roman Moser, Gmunden, Austria
[73] Assignee: Rudi Heger, Siegsdorf, Fed. Rep. of Germany
[21] Appl. No.: 921,316
[22] Filed: Oct. 21, 1986

Related U.S. Application Data

[63] Continuation of Ser. No. 633,803, Jul. 24, 1984, abandoned.
[51] Int. Cl.$^4$ .............................................. A01K 83/00
[52] U.S. Cl. .................................................. 43/43.16
[58] Field of Search ................... 43/43.16, 42.7, 44.82, 43/34

[56] References Cited
U.S. PATENT DOCUMENTS

| 828,505 | 8/1906 | Rice | 43/43.16 |
| 2,841,914 | 7/1958 | Butler | 43/43.16 |
| 2,865,131 | 12/1958 | Ellis | 43/43.16 |
| 3,564,749 | 2/1971 | Shigekatsu | 43/43.16 |
| 4,028,838 | 6/1977 | Flower | 43/43.16 |

FOREIGN PATENT DOCUMENTS 2067882 8/1981 United Kingdom ............... 43/43.16

Primary Examiner—Kurt Rowan
Attorney, Agent, or Firm—Kokjer, Kircher, Bradley, Wharton, Bowman & Johnson

[57] ABSTRACT

A barbless fish hook having particular application to fly fishing. The fish hook has a flat barbless point which is specially shaped to penetrate and remain embedded in fish and yet can be easily removed by the fisherman. The point has opposing flat surfaces, one of which faces the shank. The side edges which bound the faces of the point converge from a pair of nodes to form a sharp tip. The width of the point between the nodes is greater than the diameter of the wire which forms the bend of the hook.

15 Claims, 7 Drawing Figures

U.S. Patent  Feb. 9, 1988  4,723,372
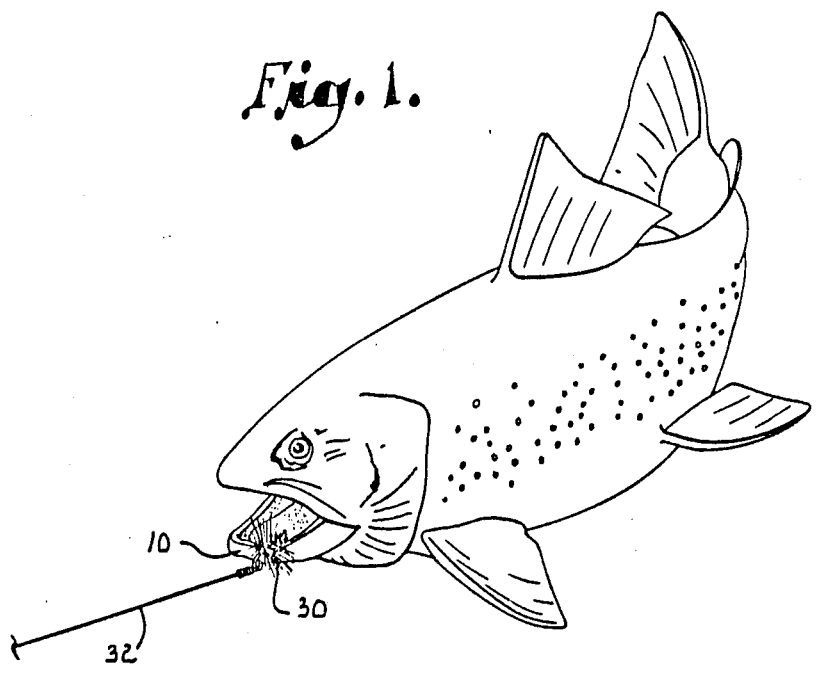
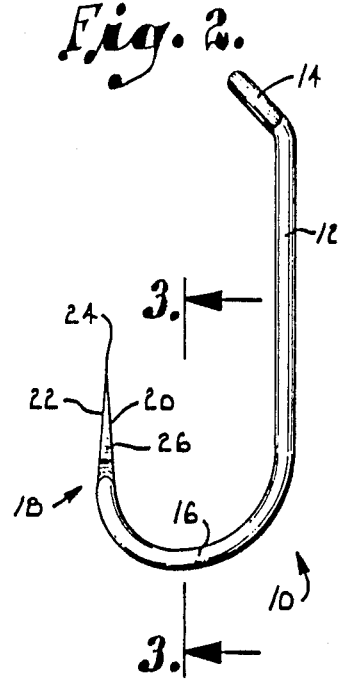
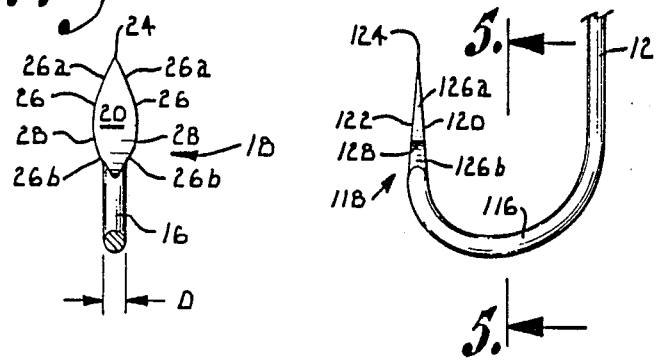
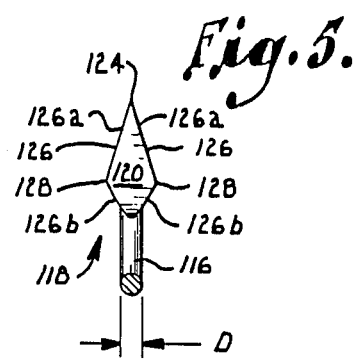
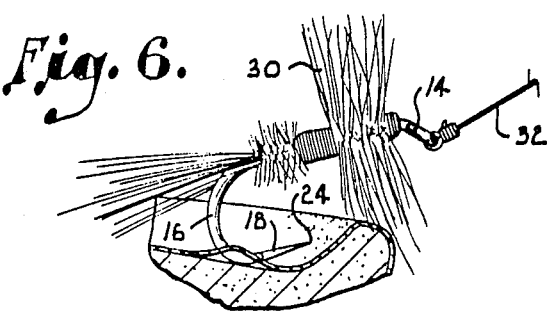
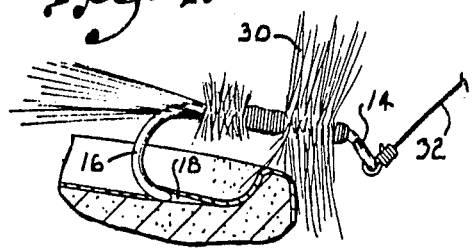

BARBLESS FISH HOOK

This is a continuation of application Ser. No. 633,803, filed July 24, 1984 now abandoned.

BACKGROUND OF THE INVENTION

This invention relates generally to fish hooks and more specifically to a uniquely shaped barbless fish hook having particular utility in fly fishing.

The fish hook has been used at least since the Paleolithic age and is thus one of the oldest known implements. The earliest form was not actually a hook as such but was instead a device known as a gorge formed by a straight shaft having pointed opposite ends and a central groove for attaching the line. The gorge was made from stone, shells, antlers or bones and was used until the beginning of the Neolithic age when the first curved fish hooks appeared.

The earliest versions of the curved fish hook were made from bone. Copper fish hooks came later and bronze hooks still later during the Bronze Age. The bronze hooks that were made during this period were shaped much like modern fish hooks and included barbs near the point and eyes for attaching the fishing line. Since the Iron Age, fish hooks have usually been made from iron and steel. Modern fish hooks are made at least in part by automatic machinery and they are usually made from carbon steel, although stainless steel is also used, particularly for hooks that are to be used in waters where corrosion is a serious problem.

Throughout the long history of fish hooks, a wide variety of sizes, shapes and materials have been proposed. The typical modern hook has a shank which may be straight or curved, a ring or eye on one end of the shank for securing the fishing line, a curved bend on the other end of the shank, a sharp point on the free end, and a barb which maintains the hook lodged in the mouth of the fish. All parts of the fish hook can have various sizes and shapes, and the throat depth and gap dimension also vary rather widely. At present, fish hooks are universally made from wire which is usually round but is sometimes forged or shaped in a knife edge configuration.

Barbless hooks have recently been used with increasing frequency, often pursuant to rules which mandate their use in certain geographical areas or when fishing for certain species of fish. Even when there are no rules requiring their use, barbless hooks have advantages over barbed hooks in many respects. Many fly fishermen, when practicing "catch and release" trout fishing, are generally opposed to barbed hooks believing that they permanently damage and/or eventually kill the trout after release. The barb can also cause significant damage when the hook inadvertently becomes embedded in the hand or another part of the human body. Furthermore, since flies are "tied" to a hook, the need for a barb to hold the bait on the hook is obviated.

Articles of interest and which generally appeared in FLY FISHERMAN magazine (FFM) and are: "Understanding Hooks", Vol. 13, #2 by Craig Woods, pp. 40–42; "Barbless Hooks", Vol. 4, #2 by Charles Ritz, pp. 30–31; and "Barbless Hooks", by Matt Vinceguerra, Vol. 3, #3.

Despite these advantages, widespread acceptance of the barbless hook has been lacking, primarily because of the shortcomings in the barbless hooks that have been available. Plain pointed hooks, which are essentially conventional hooks without a barb, are less than satisfactory because they can be dislodged too easily from the mouth of the fish and can thus result in fish escaping before they can be landed. Barbless hooks referred to as humped hooks have projecting humps which impede the hook in penetrating the fish and can also cause mutilation as bad as the damage caused by barbs. Barbless hooks as well as conventional barbed hooks often tear through the tissue of the fish. Due to its relatively small diameter, the wire which forms the fish hook offers little resistance to being torn through the tissue and tends to pull through the tissue by slicing action when subjected to large forces. More likely than not, the damaged fish escapes with significantly shorter life expectancy.

SUMMARY OF THE INVENTION

It is thus apparent that, despite the significant improvements that have been made as the fish hook has developed through the years, there is still considerable room for improvement in fish hook construction, particularly with respect to barbless hooks. My invention is directed to an improved barbless fish hook which is specially shaped to readily penetrate the fish and yet can be dislodged easily but not so easily that fish are likely to be lost prior to landing. The special point of the fish hook is also constructed to present a generally or substantially flat surface which resists being torn through the tissue of the fish.

In accordance with the invention, I provide a fish hook in which the shank, eye and bend are conventional and can take on virtually any size, style or shape. The special point has a unique barbless construction which makes the hook especially well suited for use in fly fishing. The point is flattened and has opposing planar faces, one of which faces toward the shank of the fish hook. The relatively large surface area presented by this substantially flat face greatly reduces the possibility that the point will tear through the tissue of the fish, especially in those cases where the point is embedded in the mouth of the fish rather than being cleanly hooked through it.

The flat face on the point of the fish hook has a special configuration which facilitates penetration of the fish and also allows the hook to be easily dislodged but not unduly so. The point has a tapered shaped formed by opposite side edges which converge to form a sharp tip. The edges diverge away from the tip toward a pair of nodes which define the maximum width of the point, and the edges then converge again as they extend away from the nodes toward the bond. The width dimension between the nodes is considerably greater than the diameter of the wire which forms the bend, so the point tends to remain lodged in the mouth of the fish when it has penetrated beyond the nodes. At the same time, the tapered area between the nodes and bend permits the point to be removed by the fisherman without requiring undue pulling and without significantly damaging the fish. Preferably, the area between the nodes and tip is tapered more gradually than the area between the nodes and bend so that the point can penetrate the fish more easily than it can be removed.

DESCRIPTION OF THE DRAWING

In the accompanying drawing which forms a part of the specification and is to be road in conjunction therewith and in which like reference numerals are used to indicate like parts in the various views:

FIG. 1 is a perspective view showing a fish hooked on a novel barbless fish hook constructed according to a preferred embodiment of the present invention;

FIG. 2 is a side elevational view on an enlarged scale of the fish hook;

FIG. 3 is a fragmentary view, partially in section, taken generally along line 3—3 of FIG. 2 in the direction of the arrows;

FIG. 4 is a fragmentary side elevational view of an alternative embodiment of the fish hook;

FIG. 5 is a fragmentary view, partially in section, taken generally along line 5—5 of FIG. 4 in the direction of the arrows;

FIG. 6 is a side elevational view showing a fly tied to the shank of the fish hook and diagrammatically showing the fish hook hooked through the mouth of a fish; and FIG. 7 is a side elevational view similar to FIG. 6, but diagrammatically showing the point of the hook embedded in the mouth of a fish.

DETAILED DESCRIPTION OF THE INVENTION

With initial reference to FIG. 2 in particular, the present invention provides a barbless fish hook which is generally identified by reference numeral 10. The fish hook 10 is preferably formed from round wire made from carbon steel or stainless steel. However, other materials can be used and the wire can have a shape other than round in section.

The fish hook 10 has a straight shank 12. On one end of the shank 12, a ring or eye 14 is formed so that the fish hook can be attached to a fishing line. The eye 14 is shown as a turned down eye, although it can be another type of eye, such as a turned up eye or a ringed eye. Similarly, the shank 12 is shown as a straight shank but can be another shape such as a humped shank, a stepped shank or a curved shank. A smoothly curved bend 16 is integral with the end of the shank 12 opposite the eye 14. It should be understood that the shank 12, eye 14 and bend 16 can have virtually any desired style, shape and size.

As thus far described, the fish hook 10 is conventional. In accordance with the present invention, a special barbless point 18 is formed on the free end of the curved bend 16. The point 18 is flattened and includes a pair of opposing surfaces or faces 20 and 22. Each face 20 and 22 is planar. The inside face 20 faces directly toward the shank 12. In a preferred form of the invention, face 20 is contained in a plane which is substantially perpendicular to a plane which passes through the center of the wire which forms the shank 12 and bend 16. The outside face 22 faces generally away from the shank 12 in a direction opposite face 20. It should be noted that the point 18 can be turned outwardly or inwardly somewhat rather than being generally parallel to the shank 12 as shown in FIG. 2; however, in the preferred embodiment point 18 will be within an arc of 0° to 20° from a plane parallel to shank 12.

The two opposing faces 20 and 22 of the point 18 gradually converge as they extend from the bend 16 toward the free end of the point on which a sharp tip 24 is formed.

FIG. 3 best shows one configuration for the surface 20. The other surface 22 has the same configuration. Surfaces 20 and 22 are bounded by opposite side edges 26 which curve smoothly between the tip 24 and the intersection of the point 18 with the bend 16. Each edge 26 is convex. The side edges 26 have portions 26a located adjacent the tip 24 and additional portions 26b located adjacent the bend 16. Nodes 28 are formed at the points where the edge portions 26a and 26b meet. Edge portions 26a converge at the tip 24 in order to provide the tip with a sharp point for penetration of fish. The edge portions 26a diverge as they extend from the tip 24 to the nodes 28. The other edge portions 26b diverge and project outwardly from the wire as they extend from the bend 16 toward the nodes 28.

The distance between the nodes 28 is the maximum lateral dimension of the surfaces 20 and 22 and thus defines the maximum width of the point 18. As clearly shown in FIG. 3, the width of the point is considerably greater than the diameter D of the round wire which forms the bend 16 and the remainder of the fish hook. It is important to note that edge portions 26a are curved in a more gradual manner than the other edge portions 26b such that edge portions 26a diverge as they approach nodes 28 more gradually than edge portions 26b. Thus, edge portions 26a give the tip portion of the point a more gradually tapered shape than the area of the point located adjacent to the bend 16. This configuration makes it easier for the point to penetrate a fish than to be removed.

The fish hook 10 is especially useful in fly fishing. As best shown in FIGS. 1, 6 and 7, a fly 30 can be tied on the shank 12, and a fishing line 32 can be secured to the eye 14. FIG. 6 shows the fish hook 10 hooked completely through the mouth of a fish. The sharply pointed tip 24 easily penetrates the mouth of the fish when it strikes. When the fish is hooked in the manner shown in FIG. 6, it tends to remain hooked since the pull on the line is away from the tip 24. Even if the line becomes slack or the fish moves toward the fisherman, the relatively wide area presented between the nodes 28 prevents the point 18 from becoming too easily unhooked from the mouth of the fish. Thus, even though the fish hook does not have a barb, it is no more likely than a barbed hook to become unhooked as the fish is being reeled in and landed. However, once the fish has been landed, the hook can be easily removed by the fisherman simply by pulling it backwardly so that the point is released from the fish.

Since the tip portion of the point is tapered gradually, the tip 24 can penetrate the fish relatively easily. The less gradual taper of the portion of the point adjacent to bend 16 makes removal of the hook more difficult than penetration, although the point can still be removed much more easily and with less mutilation of the fish than a barbed hook.

FIG. 7 shows a situation where the point 18 is embedded in the mouth of the fish rather than hooked through the mouth. In this situation, the hook 10 is retained in the mouth of the fish much more firmly than a conventional hook that does not have a flat surface on its point. The pull on the line 32 is downwardly and away from the fisherman. Thus, the relatively large surface area presented by surface 20 prevents the point 18 from being pulled through the tissue of the fish in a slicing action as often occurs with conventional points constructed of relatively small diameter wire. Since the force is spread over the large surface area presented by face 20, the force is less concentrated than in the case of a wire point, and the point is less likely to slice through the tissue due to the greater resistance offered by face 20.

FIGS. 4 and 5 show an alternative embodiment of the invention which differs from the embodiment described earlier only in the configuration of the point. The barbles point 118 shown in FIGS. 4 and 5 includes flat opposing faces 120 and 122 which correspond to the surfaces 20 and 22 but are shaped slightly differently. As best shown in FIG. 5, the opposite side edges 126 which bound surfaces 120 and 120a are straight edges rather than curved edges. Each edge has a straight edge portion 126a adjacent the sharp tip 124 of the point. Edge portions 126a gradually diverge as they extend way from the tip 24 to give the point a gradually tapered configuration. Edge portions 126a meet with additional straight edge portions 126b at nodes 128 which are more pronounced than the nodes 28 formed on the curved edges 26. Edge portions 126b converge as they extend away from the nodes 128 toward the bend 116. Again, edge portions 126a diverge toward nodes 128 more gradually than edge portions 126b so that the point can penetrate the mouth of a fish more easily than it can be removed. The width of the point defined between the nodes 128 is again considerably greater than the diameter D of the wire.

The point 118 shown in FIGS. 4 and 5 functions in essentially the same manner as the point 18 described previously. The relatively large surface area presented by face 120 resists pulling of the point through the tissue and thus maintains the point embedded in the fish and prevents it from slicing through the tissue.

It is thus evident that my new fish hook has virtually all the advantages of the barbed hook and none of the disadvantages. Once a fish is hooked, it is no more likely to escape than in the case of a barbed hook due to the configuration of my special flattened point. The absence of a barb on my hook avoids excessive mutilation of fish and also eliminates the damage to the human body that can result from the point being inadvertently embedded in the hand or another area of the body. Despite the long history of the fish hook as a useful tool or implement, there has never been a hook having a flat point so far as I am aware, and I have found that the flattened point results in a hook that functions in an improved manner for the reasons given previously.

It is preferred that the distance between the nodes 28 or 128 be at least twice as great as the diameter of the wire which forms the bend of the fish hook. However, in most applications of the fish hook 10, these relative dimensions can vary without detracting unduly from the ability of the fish hook to function in an effective manner. In addition to the configurations shown in FIGS. 3 and 5, flat surfaces formed on the point of the fish hook can take on various other configurations without changing the basic manner in which the point functions.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A barbless fish hook comprising:
    a shank having opposite ends;
    an eye on one end of said shank for connection with a fishing line;
    a bend portion of the fish hook formed from wire having a preselected diameter connected with the other end of said shank and having a curved configuration; and
    a barbless point portion connected with said bend portion and located at a distal end thereof, said point portion spaced at a sufficient distance from said shank to normally preclude the wedging or holding of fish tissue between the point portion and the shank when a fish is caught on said hook, said point portion terminating in a sharp tip and having a substantially flat surface smoothly converging with said end portion with a maximum lateral dimension greater than the preselected diameter of the wire and facing generally parallel and toward said shank and further being defined as having no extension for retaining a hooked fish thereon pointing generally in the direction of the bend portion.

2. The invention of claim 1, wherein:
    said bend portion of the fish hook is formed from wire having a preselected diameter; and
    said flat surface has a maximum lateral dimension greater than the preselected diameter of the wire.

3. The invention of claim 1, including opposite side edges of said flat surface which converge toward a free end of said point to form said sharp tip thereon.

4. The invention of claim 3, wherein:
    said bend portion of the fish hook is formed from wire having a preselected diameter; and
    said side edges define a maximum lateral dimension of said flat surface greater than the preselected diameter of the wire.

5. The invention of claim 4, wherein said side edges include:
    first portions which diverge away from said sharp tip; and
    second portions which connect with thee respective first portions at nodes between which said maximum lateral dimension of said flat surface is defined, said second portions generally converging away from said nodes.

6. The invention of claim 5, wherein said first and second portions of said side edges are substantially straight.

7. The invention of claim 6, wherein said first edge portions converge away from said nodes more gradually than said second edge portions converge away from said nodes.

8. The invention of claim 5, wherein said first and

9. The invention of claim 8, wherein said first edge portions are curved more gradually than said second edge portions.

10. The invention of claim 1, wherein;
    said shank and bend portion occupy a common plane; and
    said flat surface lies in a plane oriented substantially perpendicular to said common plane.

11. In a barbless fish hook having a shank, an eye on one end of the shank, and a curved bend on the other end of the shank all constructed from wire, an improved barbless point structure comprising:

a barbless point portion located on a distal end on the bend of the fish hook, and defining a substantially flat surface coplanar with the point and parallel to and facing said shank, said point portion spaced at a sufficient distance from said shank to normally preclude the wedging or holding of fish tissue between the point portion of the shank when a fish is caught on said hook, said point portion having a substantially flat configuration smoothly convering with said bend portion and having no extension for retaining a hooked fish thereon pointing generally in the direction of said curved portion; and a pair of opposite side edges of said point portion coverging toward a free end of the point portion to form a sharp tip on said free end for penetration of fish, said side edges having a maximum distance therebetween defining a maximum lateral dimension on said flat surface greater than the diameter of the wire.

12. The invention of claim 11, including:

a first edge portion, of each side edge extending from said sharp tip;

a second edge portion of each side edge connected with said first portion thereof; and a pair of nodes defined at the intersection between the first and second portions of said side edges, said maximum lateral dimension being defined between said nodes.

13. The invention of claim 12, wherein:

said first portions of the side edges diverge toward said nodes; and said second portions of the side edges diverge toward said nodes; and said second portions of the side edges diverge toward said nodes less gradually than said first portions.

14. The invention of claim 13, wherein said first and second edge portions are substantially straight.

15. The invention of claim 13, wherein said first and second edge portions are curved.

* * * * *